US011829668B2

(12) United States Patent
Yamasaki et al.

(10) Patent No.: US 11,829,668 B2
(45) Date of Patent: Nov. 28, 2023

(54) PRINT JOB MANAGEMENT APPARATUS, PRINT JOB MANAGEMENT METHOD, AND NON-TRANSITORY COMPUTER READABLE MEDIUM

(71) Applicant: FUJIFILM Business Innovation Corp., Tokyo (JP)

(72) Inventors: Naoto Yamasaki, Kanagawa (JP); Bo Liu, Kanagawa (JP); Yuta Kobayashi, Kanagawa (JP); Yuka Sugiyama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/697,936

(22) Filed: Mar. 18, 2022

(65) Prior Publication Data
US 2023/0089651 A1    Mar. 23, 2023

(30) Foreign Application Priority Data
Sep. 21, 2021   (JP) ................... 2021-153430

(51) Int. Cl.
*G06F 3/12*       (2006.01)
*G06V 30/148*   (2022.01)

(52) U.S. Cl.
CPC .......... *G06F 3/1259* (2013.01); *G06F 3/1204* (2013.01); *G06F 3/1207* (2013.01); *G06V 30/153* (2022.01)

(58) Field of Classification Search
CPC .... G06F 3/1259; G06F 3/1204; G06F 3/1207; G06V 30/153; Y02P 90/30
USPC ....................................... 358/1.15
See application file for complete search history.

(56) References Cited

U.S. PATENT DOCUMENTS 6,937,355 B1 *   8/2005   Miyazawa .............. G06F 3/121
358/1.14
2009/0313145 A1 *   12/2009   Hamilton, II ......... G06F 3/1221
705/30

FOREIGN PATENT DOCUMENTS

JP          2017-188856          10/2017

* cited by examiner

*Primary Examiner* — Darryl V Dottin
(74) *Attorney, Agent, or Firm* — JCIPRNET

(57) ABSTRACT

A print job management apparatus includes a processor, and a storage device configured to store data of an expected result of a print job. The processor is configured to: read the data of the expected result from the storage device; obtain data of an actual result printed and output in accordance with the print job; and based on a result of comparison between the data of the expected result and the data of the actual result, obtain a processing status of the print job.

16 Claims, 14 Drawing Sheets

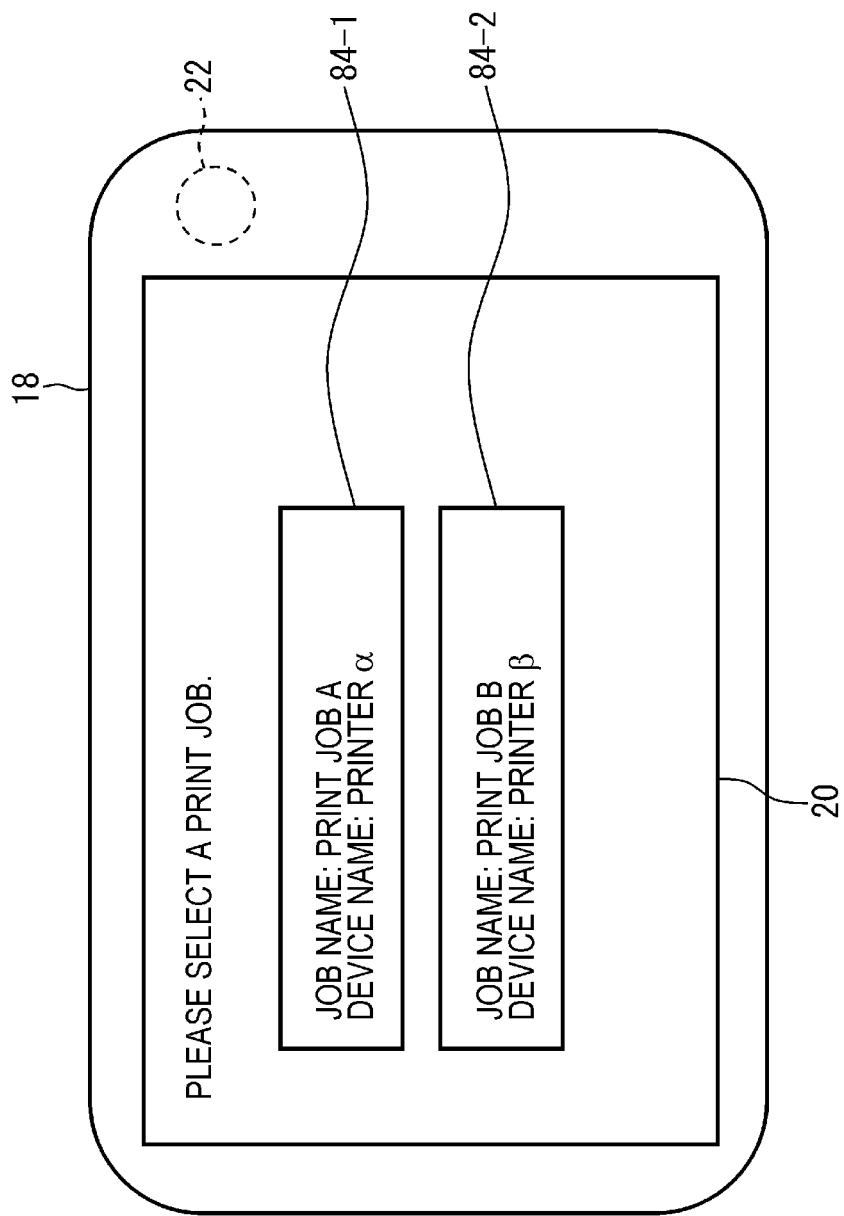

PRINT JOB MANAGEMENT APPARATUS, PRINT JOB MANAGEMENT METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-153430 filed Sep. 21, 2021.

BACKGROUND

(i) Technical Field

The present disclosure relates to a print job management apparatus, a print job management method, and a non-transitory computer readable medium.

(ii) Related Art

A wide variety of printed matters are produced at printing factories or the like. A printed matter producing process includes the following processes: submitting a manuscript, pre-pressing, printing, post-processing, and shipping. In the printed matter printing process, a print job generated for each printed matter is input to a printer and is processed. The status of each print job, such as pending, processing, or processing completed, is managed by a process management system. For example, an operator of the printing process operates a terminal apparatus to report the processing status of each print job (such as whether processing is completed without problems) to the process management system, and the process management system updates the status of each print job.

Japanese Unexamined Patent Application Publication No. 2017-188856 describes an information processing apparatus that uses periodically-taken images of a paper output area of an image forming apparatus and identification information of a user related to a print completion event of the image forming apparatus to detect forgetting to take a printed matter in the paper output area, and informs a user who has forgotten to take the printed matter.

The operator of the printing process is required to determine, by looking at a printed result, the processing status of a print job corresponding to the printed result, such as whether processing of the print job is completed without problems, and to report that to the process management system (hereinafter may also be referred to as a print job management apparatus). However, while a wide variety of print jobs are being processed, the operator may not be able to easily determine, by looking at printed results, the processing status of the print jobs corresponding to the printed results.

SUMMARY

Aspects of non-limiting embodiments of the present disclosure relate to making it unnecessary for an operator to determine the processing status of a print job.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a print job management apparatus including a processor and a storage device configured to store data of an expected result of a print job, wherein the processor is configured to: read the data of the expected result from the storage device; obtain data of an actual result printed and output in accordance with the print job; and, based on a result of comparison between the data of the expected result and the data of the actual result, obtain a processing status of the print job.

BRIEF DESCRIPTION OF THE DRAWINGS

Exemplary embodiments of the present disclosure will be described in detail based on the following figures, wherein:

FIG. 14 is a diagram illustrating an example of a print job selecting screen.

DETAILED DESCRIPTION

Figure 1:
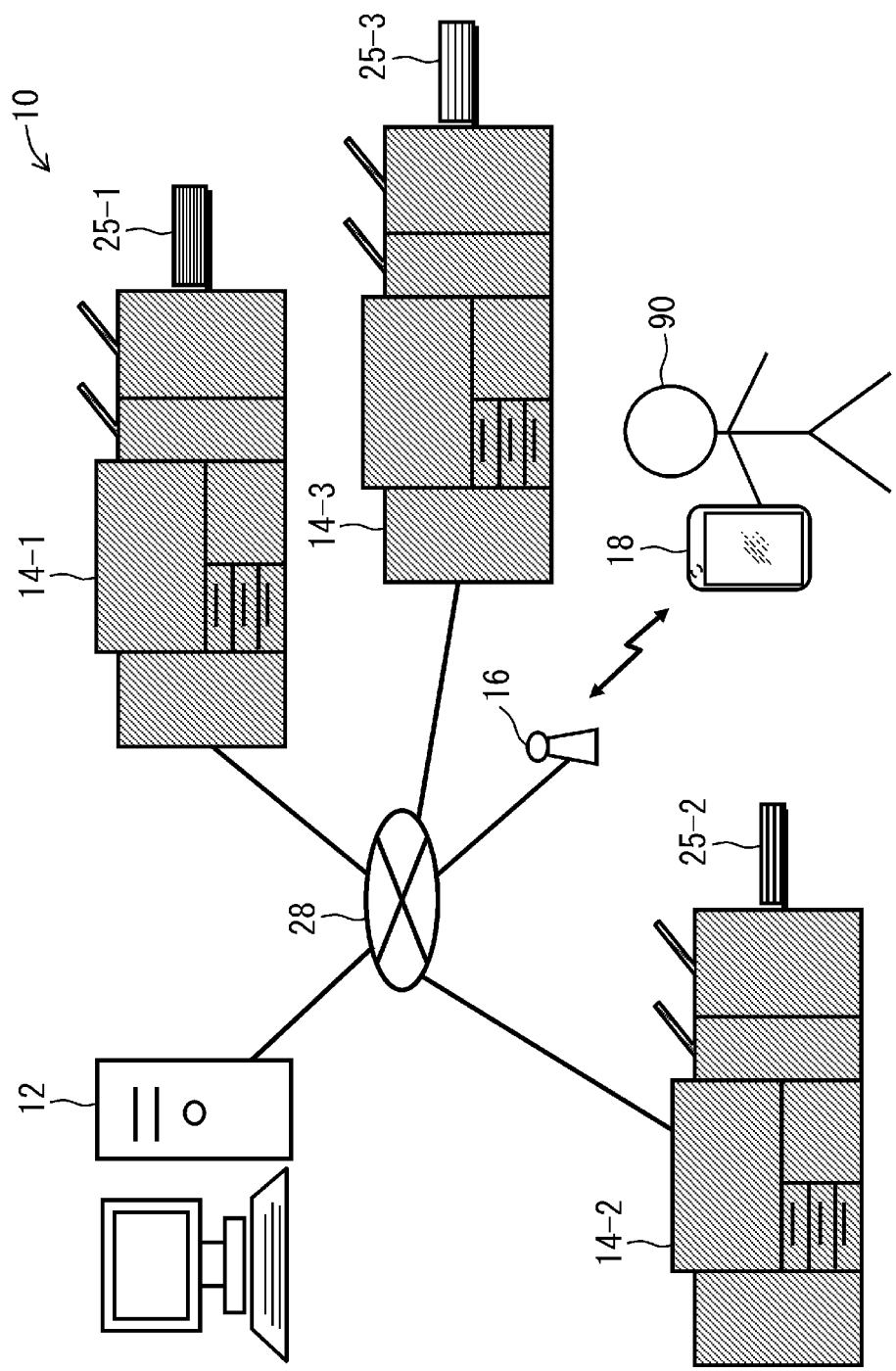
FIG. 1 is a schematic diagram of a management system for print jobs.

Hereinafter, exemplary embodiments of the present disclosure will be described in detail while checking the attached drawings. Configurations described below are illustrative examples for descriptions, and may be changed as needed in accordance with the specification of a system, apparatus, or the like. In the case where a plurality of embodiments, modifications, and the like are included in the following description, it is assumed from the beginning that characteristic portions thereof are appropriately combined and used. Note that the same elements are designated by the same reference numeral in all the drawings, and overlapping descriptions are omitted.

FIG. 1 is a schematic diagram of a management system 10 for print jobs. The management system 10 is used at a printing factory or the like. The management system 10 includes a management apparatus 12 for print jobs, a plurality of printers 14-1, 14-2, and 14-3, and a portable terminal apparatus 18, and they are communicably connected to each other via a network 28. Note that the number of each apparatus illustrated in FIG. 1 is exemplary, and the number is changeable as needed. Hereinafter, when it is unnecessary to distinguish the printers 14-1, 14-2, and 14-3, they will be collectively referred to as the printer 14. The network 28 is, for example, a local area network (LAN), an intranet, or the Internet.

The management apparatus 12 for print jobs is a computer, and is, for example, an apparatus that performs some of the functions of a process management system for printed matters. A printed matter producing process includes the following processes: submitting a manuscript, pre-pressing, printing, post-processing, and shipping. The process management system is a system that manages information indicating to which process the production of each printed matter has reached. The management apparatus 12 for print jobs is an apparatus that manages, among items of information managed by the process management system, the status of a print job particularly in the printing process (and possibly in the post-processing process).

Here, a print job is a print command that defines the specification, image, and so forth of a printed matter to be generated by the printer 14, and take the form of an electronic file or a group of electronic files, for example. Identification information such as a job name is given to a print job to distinguish it from other print jobs. Note that a print job may include commands regarding post-processing, such as commands regarding cutting, folding, and stapling.

The status of a print job is the current status of a print job, such as the fact that the print job is currently being processed by the printer 14 (status: processing), the print job has been already processed by the printer 14 (status: completed), or the print job has not been processed yet by the printer 14 (status: pending).

The printer 14 is an apparatus that forms an image on a medium such as paper, and may also be referred to as an image forming apparatus. The printer 14 is, for example, an electrophotographic printer, an inkjet printer, or an offset printer. Note that the printer 14 may have functions regarding post-processing, such as the functions of cutting, folding, and stapling.

FIG. 1 illustrates actual results (printed results) 25-1, 25-2, and 25-3 ejected to the output trays of the printers 14-1, 14-2, and 14-3, respectively. Hereinafter, when it is unnecessary to distinguish the actual results 25-1, 25-2, and 25-3, they will be collectively referred to as the actual result 25. The actual result 25 is a printed result actually ejected from the printer 14 by the operation of the printer 14 in accordance with a print job, that is, a medium processed in accordance with print job.

The terminal apparatus 18 is, for example, a tablet or a smartphone, and has the camera function. The terminal apparatus 18 is wirelessly connected to an access point 16, and is connected to the network 28 via the access point 16. The terminal apparatus 18 is possessed by an operator 90 of the printing process.

Figure 2:
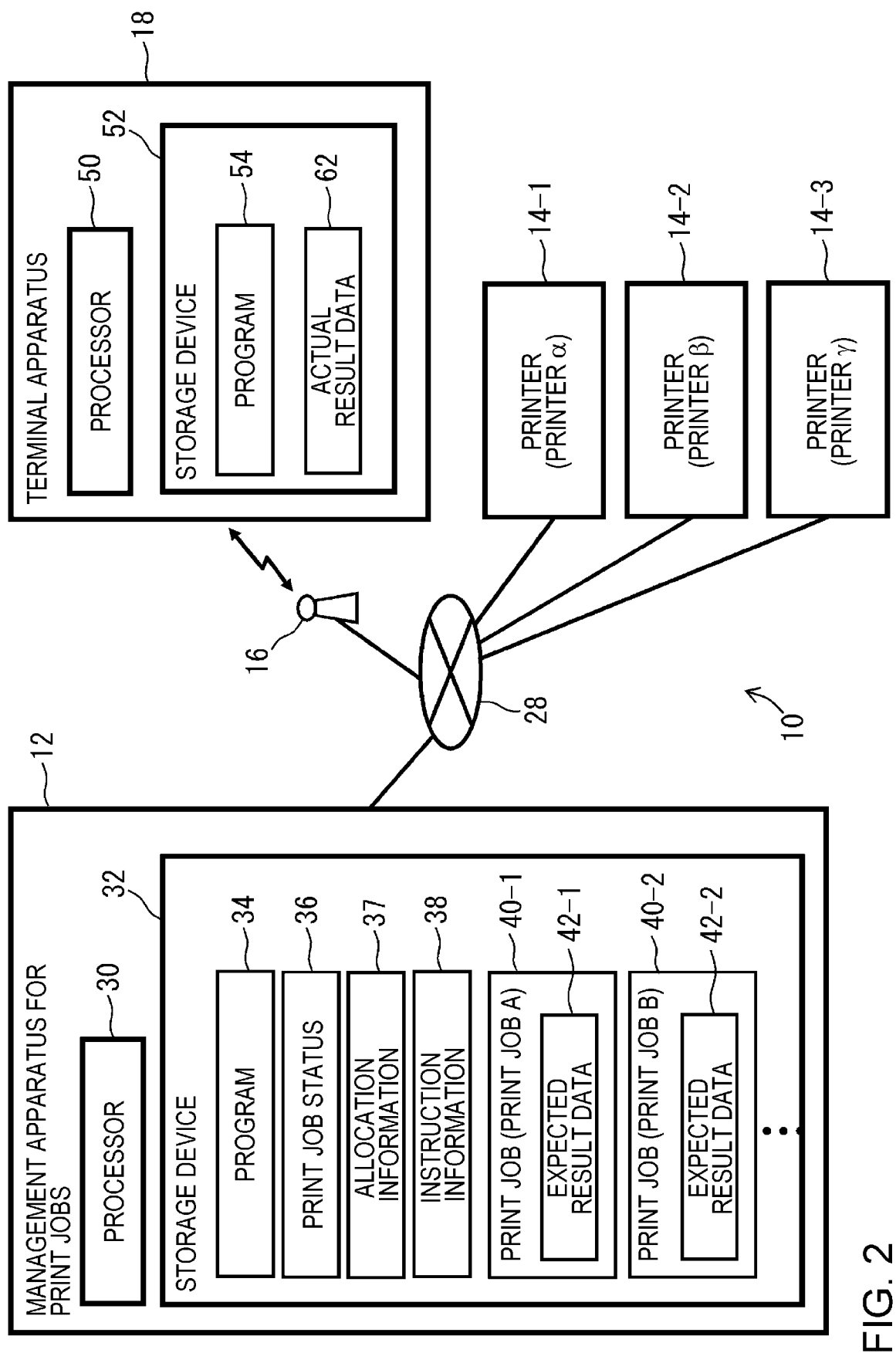
FIG. 2 is a functional block diagram of the management system for print jobs.

FIG. 2 is a functional block diagram of the management system 10 for print jobs. The management apparatus 12 for print jobs includes a processor 30 and a storage device 32. The processor 30 includes a central processing unit (CPU), and executes information processing in accordance with a program 34 installed in the management apparatus 12. Note that the processor 30 may be defined as a computer in a narrow sense. The storage device 32 is read-only memory (ROM), random-access memory (RAM), flash memory, a hard disk, or the like.

The storage device 32 stores the program 34, a print job status 36, allocation information 37, instruction information 38, a plurality of print jobs 40-1, 40-2, . . . , and expected result data 42-1, 42-2, . . . associated with the plurality of print jobs 40-1, 40-2, . . . , respectively. Hereinafter, when it is unnecessary to distinguish the print jobs 40-1, 40-2, . . . , they will be collectively referred to as the print job 40, and, when it is unnecessary to distinguish the expected result data 42-1, 42-2, . . . , they will be collectively referred to as the expected result data 42.

Besides providing the program 34 executed by the processor 30 of the management apparatus 12 via a network such as the Internet, the program 34 may be provided by being stored in a computer-readable recording medium such as an optical disc or Universal Serial Bus (USB) memory.

The print job status 36 is information indicating the current status of each print job. The allocation information 37 is information indicating a printer (identification information of a printer) allocated to each print job 40. The instruction information 38 is information indicating an image taking method when an image of an actual result is taken with the camera of the terminal apparatus 18 (details will be described later).

Here, the expected result data 42 will be described. At first, an expected result is a printed result expected to be ejected from the printer 14 by the operation of the printer 14 in accordance with the print job 40, that is, an expected processed medium. The expected result data 42 is information regarding the expected result. In the exemplary embodiment, the expected result data 42 includes image data of the first page and image data of the last page of the expected result. Note that this is not the only possible expected result data 42, and the expected result data 42 may be information such as image data of all pages of the expected result, the number of pages, the number of sheets to be printed, the type of paper to be printed, or the color of the paper. The image data is, for example, an image file obtained when it is assumed that an image of the first page or the last page of the expected result is taken with a camera or that the first page or the last page of the expected result is read with an image scanner. Note that the expected result data is also referred to as data of the expected result.

Note that a page means an area on one side of a medium such as paper. In the case of the mode of printing only on one side of a medium, a series of page numbers from the first page to the last page mean numbers sequentially associated only with one side of plural media. In addition, in the case of the mode of printing on both sides of a medium, a series of page numbers from the first page to the last page mean numbers sequentially associated with the front side and the back side of plural media.

The terminal apparatus 18 includes a processor 50 and a storage device 52. The processor 50 includes a CPU, and executes information processing in accordance with a program 54 installed in the terminal apparatus 18. Note that the processor 50 may be defined as a computer in a narrow sense. The storage device 52 is ROM, RAM, flash memory, a hard disk, or the like.

The storage device 52 stores the program 54 and actual result data 62. Besides providing the program 54 executed by the processor 50 of the terminal apparatus 18 via a network such as the Internet, the program 54 may be provided by being stored in a computer-readable recording medium such as an optical disc or USB memory.

Here, the actual result data 62 will be described. As mentioned above, an actual result is a printed result actually ejected from the printer 14. The actual result data 62 is information regarding the actual result. In the exemplary embodiment, the actual result data 62 is an image file obtained when the operator 90 takes an image of each of the first page and the last page of the actual result with the camera of the terminal apparatus 18. Note that the actual result data is also referred to as data of the actual result.

Figure 3:
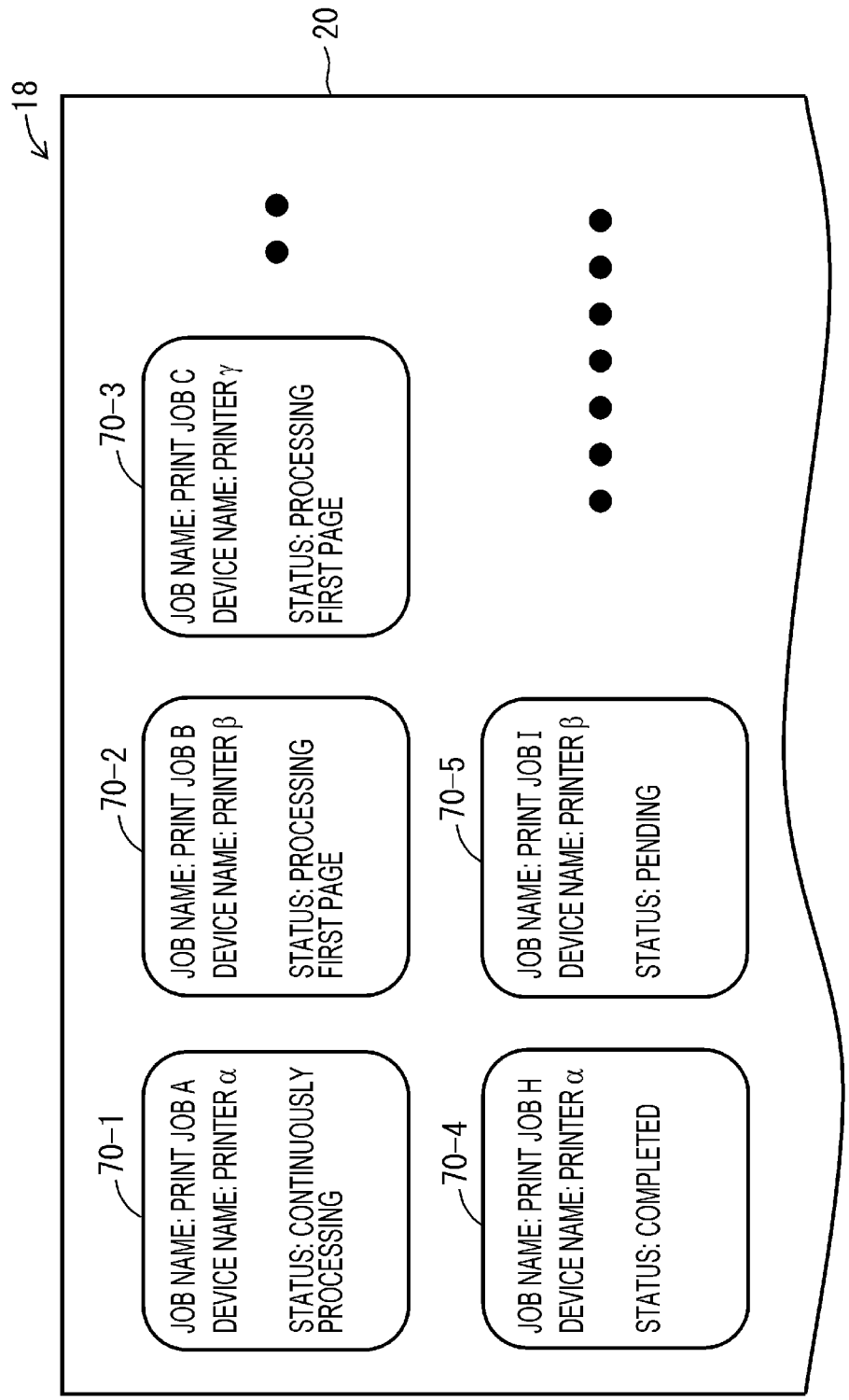
FIG. 3 is a diagram illustrating an example of a print job list screen.

The management system 10 allows the management apparatus 12 and the terminal apparatus 18 to communicate with each other, and the operator 90 may operate the management apparatus 12 using the terminal apparatus 18 and display information present in the management apparatus 12 on a display of the terminal apparatus 18. FIG. 3 is an example of a print job list screen displayed on a display 20 of the terminal apparatus 18. As illustrated in FIG. 3, boxes 70-1 to 70-5 are prepared for the individual print jobs, and items of information of the print jobs are displayed in the boxes 70-1 to 70-5. Specifically, the allocation information 37 and the print job status 36, which are stored in the management apparatus 12, are displayed in the boxes 70-1 to 70-5 of the print jobs.

The display 20 of the terminal apparatus 18 is a touchscreen. The operator 90 touches the box (one of the boxes 70-1 to 70-5) of a desired print job, thereby displaying a screen (not illustrated) for setting and operating that print job. On that screen, the operator 90 allocates a printer to the print job, and gives a command to send the print job.

In the exemplary embodiment, when an operator gives a command to send a print job, the print job is sent from the management apparatus 12 to an allocated printer 14, and printing starts on the printer 14. Alternatively, after a print job is sent to the printer 14, the operator 90 may further operate the printer 14 to give a start command, and, as a result, printing may start.

The status of a print job is "pending" before printing is started. When printing of a print job starts as mentioned above, the management apparatus 12 updates the status of the print job from "pending" to "processing first page". In response to completion of verification (details will be described later) of the first page of the actual result of the print job, the management apparatus 12 updates the status of the print job from "processing first page" to "continuously processing". In response to completion of further verification (details will be described later) of the last page of the actual result, the management apparatus 12 updates the status of the print job from "continuously processing" to "completed".

Hitherto, when an operator checks the actual result ejected from the printer 14 and determines that there is no problem (a desired actual result is obtained), for example, the operator selects a print job corresponding to the actual result from the list screen illustrated in FIG. 3 and reports the completion of the processing. In doing so, the management apparatus 12 updates the status of the print job from "processing" to "completed". However, while print jobs of multiple types are being processed, it is not easy for the operator to determine whether there is a problem with the actual results. To this end, in the exemplary embodiment, the operator takes an image of the first page and the last page of each of the actual results with the camera of the terminal apparatus 18, and the management apparatus 12 compares image data of the actual result obtained thereby (actual result data 62) and the expected result data 42 to determine the processing status of a print job corresponding to the actual result, and updates the status of the print job.

Here, the processing status of a print job is whether the actual result output from the printer 14 in accordance with the print job is partially or entirely acceptable. The actual result being partially or entirely acceptable means that a predetermined part or the entirety of the actual result is or is assumed to be in a status equivalent to the expected result. In contrast, the actual result being partially or entirely unacceptable means that a predetermined part or the entirety of the actual result is or is assumed to be in a status not equivalent to the expected result, such as the case where an image formed in part of the actual result differs from the expected result.

Figure 4:
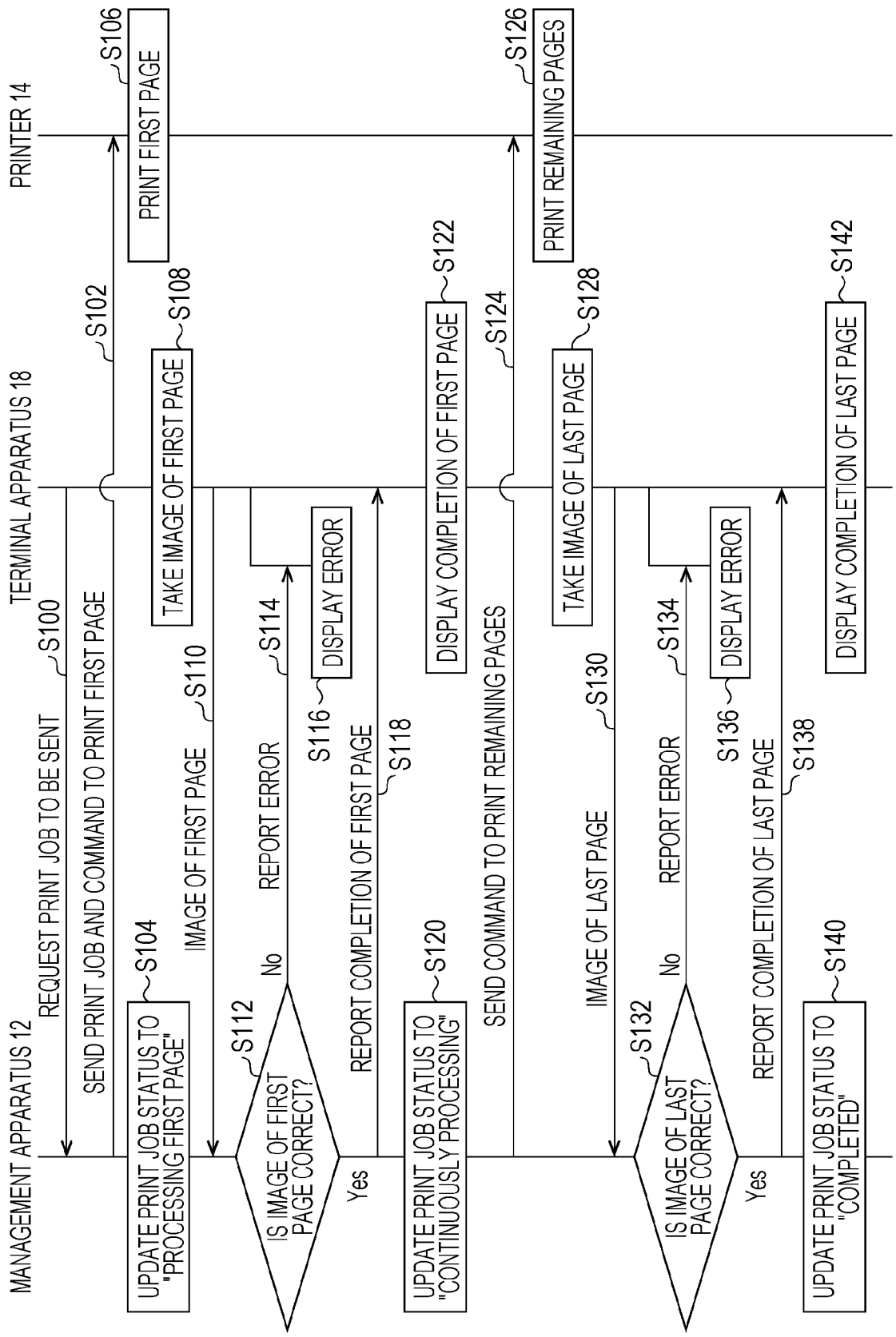
FIG. 4 is a flowchart illustrating an example of the flow of processing of a print job.
Figure 5:
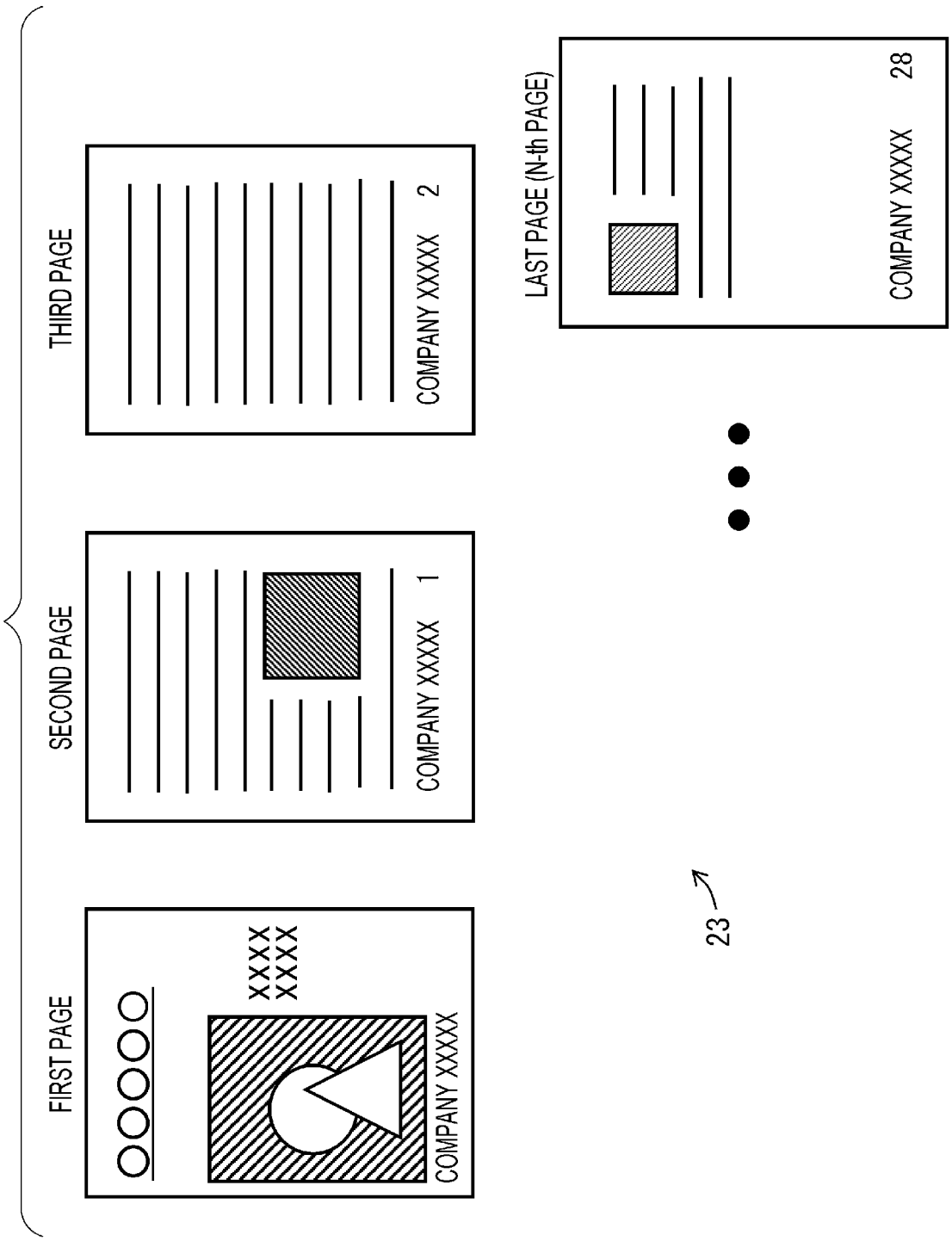
FIG. 5 is a diagram illustrating an example of an expected result.

Next, an example of processing of a print job will be described. FIG. 4 is a flowchart illustrating the flow of processing of a print job, and FIG. 5 is a diagram illustrating an example of an expected result 23 of the print job processed in the flow illustrated in FIG. 4. The expected result 23 illustrated in FIG. 5 is a result printed only on one side of paper.

At first, in S100 in FIG. 4, the operator operates the terminal apparatus 18 to specify a print job, and gives a request to send the print job. In response to the request, the management apparatus 12 sends the specified print job to a printer 14 allocated to the print job, and sends a command to print the first page to the printer 14 (S102). The management apparatus 12 updates the status of the print job from "pending" to "processing first page" (S104).

Note that the management apparatus 12 receives various types of print jobs specified as above, sends the print jobs to the respective printers 14, and simultaneously manages the print jobs whose status is "processing first page" or "continuously processing".

Next, in S106, together with reception of the print job, the printer 14 receives the command to print the first page and executes printing of the first page in accordance with the print job. Accordingly, the first page of the actual result is ejected to the output tray of the printer 14.

In S108, the operator takes an image of the first page on the output tray of the printer 14 with the camera of the terminal apparatus 18. That scene is schematically illustrated on the left side of FIG. 6. The terminal apparatus 18 has a camera 22 on the opposite side to the display 20. The operator operates the terminal apparatus 18 to activate a program (application) for verification, thereby displaying an image taking screen as indicated in the terminal apparatus 18 illustrated in FIG. 6.

The image taking screen includes a device specifying section 72 in a pull-down menu format. The operator specifies, in the device specifying section 72, a printer to which the first page, whose image is to be taken, has been ejected (identification information of a printer, such as a printer β). Alternatively, information for identifying a print job may be selected and specified from a pull-down menu format. In addition, the image taking screen includes instructions such as "Please take a picture of the first page". Such instructions are stored in advance as the instruction information 38 in the management apparatus 12, and are sent to the terminal apparatus 18 to be displayed. In the case where the printer (such as the printer β) specified in the device specifying section 72 of the image taking screen is in the status "processing first page" of the print job, the management apparatus 12 sends, as instructions, a command to take an image of the first page (see the terminal apparatus 18 illustrated in FIG. 6); and, in the case where the printer is in the status "continuously processing" of the print job, the management apparatus 12 sends, as instructions, a command to take an image of the last page (see the terminal apparatus 18 illustrated in FIG. 7).

The image taking screen also includes a frame 74, and an image reflected on the lens of the camera 22 is displayed in the frame 74. The operator arranges the first page of the actual result 25 with respect to the terminal apparatus 18 so that the entire first page fits within the frame 74, and presses a shutter button (not illustrated). Accordingly, image data of the entire first page is obtained as the actual result data 62.

In S110, identification information of the printer specified in the device specifying section 72 and image data of the first page (actual result data 62) are sent from the terminal apparatus 18 to the management apparatus 12. In S112, the management apparatus 12 receives them and verifies the first page (obtains the processing status of the first page of the print job). At first, from the identification information of the printer (such as the printer β) and the allocation information 37 and the print job status 36 in the storage device 32, the management apparatus 12 identifies a print job being processed by that printer, that is, a print job corresponding to the actual result data 62. For example, if identification information of the printer is "printer β", it is identified from FIG. 3 a "print job B" allocated to the printer β and whose status is "processing first page".

The management apparatus 12 compares the actual result data 62 and the first page of expected result data (image data of the first page of the expected result) associated with the identified print job ("print job B" in the above example) using technology of the related art, and obtains the degree to which they match. In the case where the above "degree of match" is higher than a predetermined threshold (such as the case illustrated in part (A) of FIG. 6), the management apparatus 12 determines that there is no problem with the first page of the actual result (S112: YES), and updates the status of the identified print job ("print job B" in the above example) from "processing first page" to "continuously processing" (S120). In addition, the management apparatus 12 reports completion of the first page of the identified print job ("print job B" in the above example) to the terminal apparatus 18 (S118), and, on receipt thereof, the terminal apparatus 18 displays a completion screen of the first page of the print job on the display 20 thereof (S122).

Figure 6:
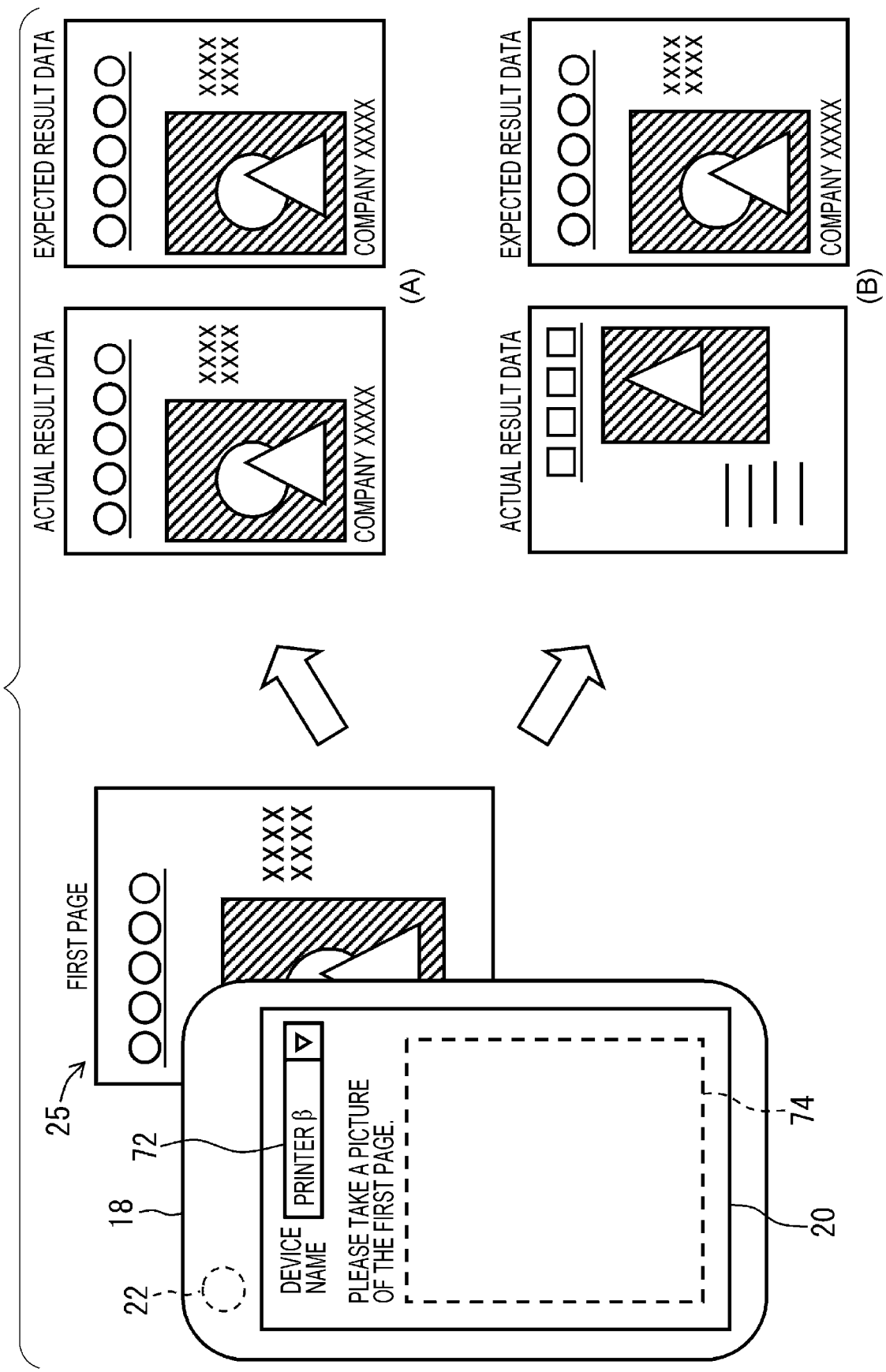
FIG. 6 is a diagram for describing verification of the first page of a print job.

In contrast, in the case where the above "degree of match" is less than or equal to the predetermined threshold (such as the case illustrated in part (B) of FIG. 6), the management apparatus 12 determines that there is a problem with the first page of the actual result (S112: NO). The management apparatus 12 reports an error of the identified print job ("print job B" in the above example) to the terminal apparatus 18 (S114), and, on receipt thereof, the terminal apparatus 18 displays an error screen of the print job on the display 20 thereof (S116). In this case, processing of the print job stops.

By verifying the first page as above, it is checked whether processing of an intended print job has started. When there is a problem with the first page, processing of the print job stops, thereby avoiding situations where a medium is uselessly wasted by continuing the processing.

In response to completion of the verification of the first page, in S124, the management apparatus 12 sends a command to print the remaining pages of the identified print job ("print job B" in the above example) to the printer 14. In S126, the printer 14 receives the command, and executes printing of the remaining pages except for the first page in accordance with the print job. Accordingly, the remaining actual result is ejected to the output tray of the printer 14.

Next, in S128, the operator takes an image of the last page of the actual result on the output tray of the printer 14 with the camera of the terminal apparatus 18. That scene is schematically illustrated on the left side of FIG. 7. This is the same work as taking an image of the first page described with reference to FIG. 6. The operator operates the terminal apparatus 18 to activate a program (application) for verification, thereby displaying an image taking screen as indicated in the terminal apparatus 18 illustrated in FIG. 7. The operator specifies, in the device specifying section 72 of the image taking screen, a printer to which the last page, whose image is to be taken, has been ejected (identification information of a printer, such as a printer β). At this time, because the status of the print job (such as the print job B) processed by the printer (such as the printer β) specified in the device specifying section 72 is "continuously processing", the management apparatus 12 sends, as instructions, a command to take an image of the last page to the terminal apparatus 18, and that is displayed on the image taking screen.

The image taking screen includes the frame 74, and an image reflected on the lens of the camera 22 is displayed in the frame 74. The operator arranges the last page of the actual result 25 with respect to the terminal apparatus 18 so that the entire last page fits within the frame 74, and presses a shutter button (not illustrated). Accordingly, image data of the entire last page is obtained as the actual result data 62.

In S130, identification information of the printer specified in the device specifying section 72 and image data of the last page (actual result data 62) are sent from the terminal apparatus 18 to the management apparatus 12. In S132, the management apparatus 12 receives them and verifies the last page (obtains the processing status of the last page of the print job). This is the same processing as verification of the first page in S112. From the received identification information of the printer (such as the printer β) and the allocation information 37 and the print job status 36 in the storage device 32, the management apparatus 12 identifies a print job being processed by that printer, that is, a print job corresponding to the actual result data 62. For example, if identification information of the printer is "printer β", the "print job B" that has been allocated to the printer β and whose status is "continuously processing" is identified.

The management apparatus 12 compares the actual result data 62 and the last page of expected result data (image data of the last page of the expected result) associated with the identified print job ("print job B" in the above example) using technology of the related art, and obtains the degree to which they match. In the case where the above "degree of match" is higher than a predetermined threshold (such as the case illustrated in part (A) of FIG. 7), the management apparatus 12 determines that there is no problem with the last page of the actual result (S132: YES), and updates the status of the identified print job ("print job B" in the above example) from "continuously processing" to "completed" (S140). In addition, the management apparatus 12 reports completion of the last page of the identified print job ("print job B" in the above example) to the terminal apparatus 18 (S138), and, on receipt thereof, the terminal apparatus 18 displays a completion screen of the last page of the print job on the display 20 thereof (S142).

Figure 7:
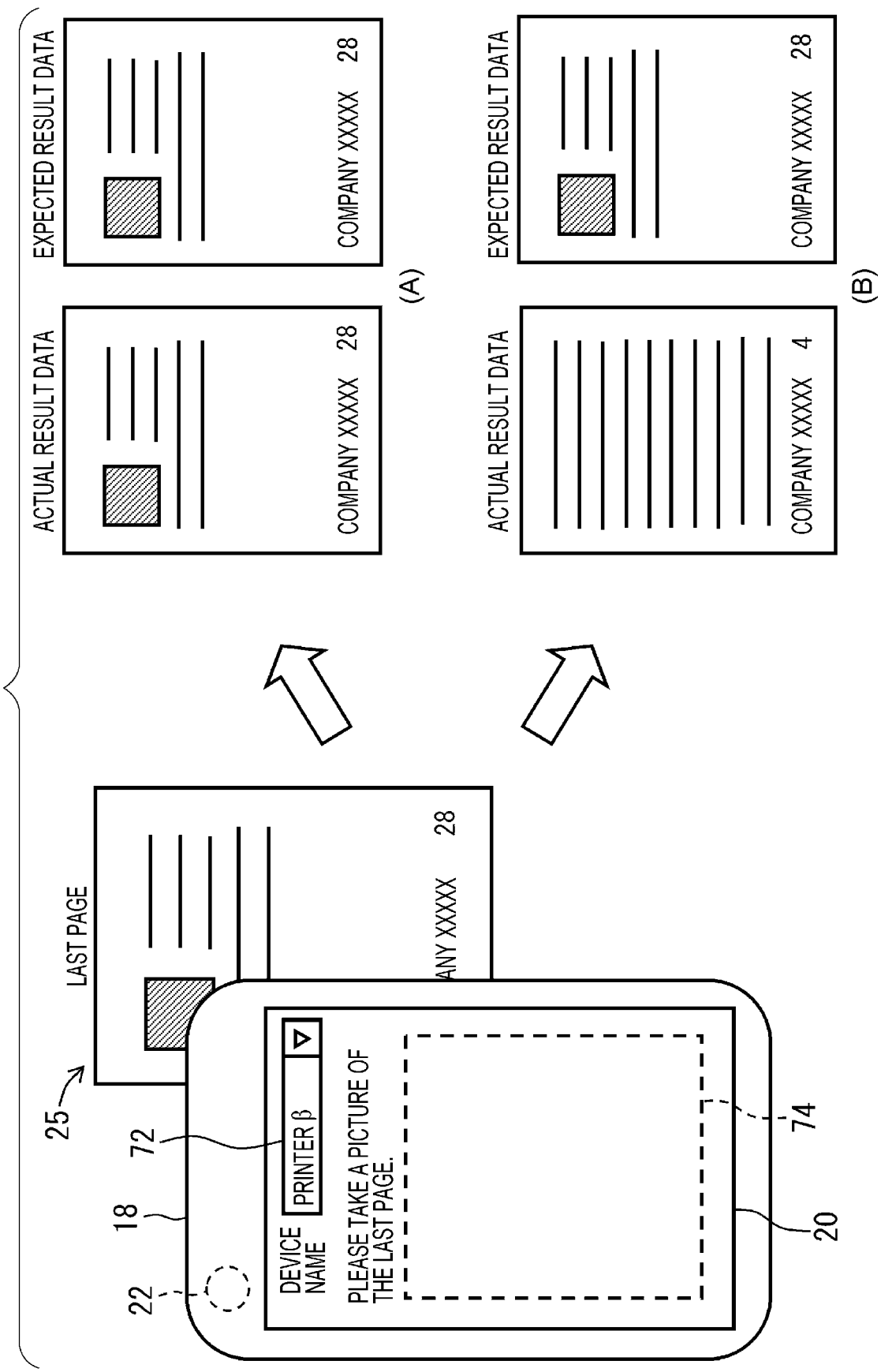
FIG. 7 is a diagram for describing verification of the last page of a print job.

In contrast, in the case where the above "degree of match" is less than or equal to the predetermined threshold (such as the case illustrated in part (B) of FIG. 7), the management apparatus 12 determines that there is a problem with the last page of the actual result (S132: NO). The management apparatus 12 reports an error of the identified print job ("print job B" in the above example) to the terminal apparatus 18 (S134), and, on receipt thereof, the terminal apparatus 18 displays an error screen of the print job on the display 20 thereof (S136).

Note that the exemplary embodiment is that, when it is determined that there is no problem with the last page of the actual result (S132: YES), it is estimated that the entire printing of the print job corresponding to the actual result is completed without problems, and the status of the print job is updated from "continuously processing" to "completed".

According to the above-described exemplary embodiment, because the operator is not required to determine the processing status of a print job, the operator will be able to work monotonously without being aware of the contents of a printed matter corresponding to the print job.

Although a print job for printing only on one side of a medium has been described in the above-described exemplary embodiment, processing may be similarly performed even in the case of a print job for printing on both sides of a medium. In the case of a print job for printing on both sides of a medium, a command to print the first page and the second page (the front side and the back side of a medium) is given in S102 in FIG. 4, and, as a result, one sheet of a medium printed on both sides is output from a printer.

Next, modifications will be described. Although verification of the first page and the last page of a print job is performed in the above-described exemplary embodiment, those pages are not the only possible pages to be verified, and one or more predetermined pages other than those pages may be verified. In addition, in the case where a post-processed actual result is obtained because the print job includes commands regarding post-processing, such as cutting, folding, and stapling, verification may be performed on the actual result.

Figure 8:
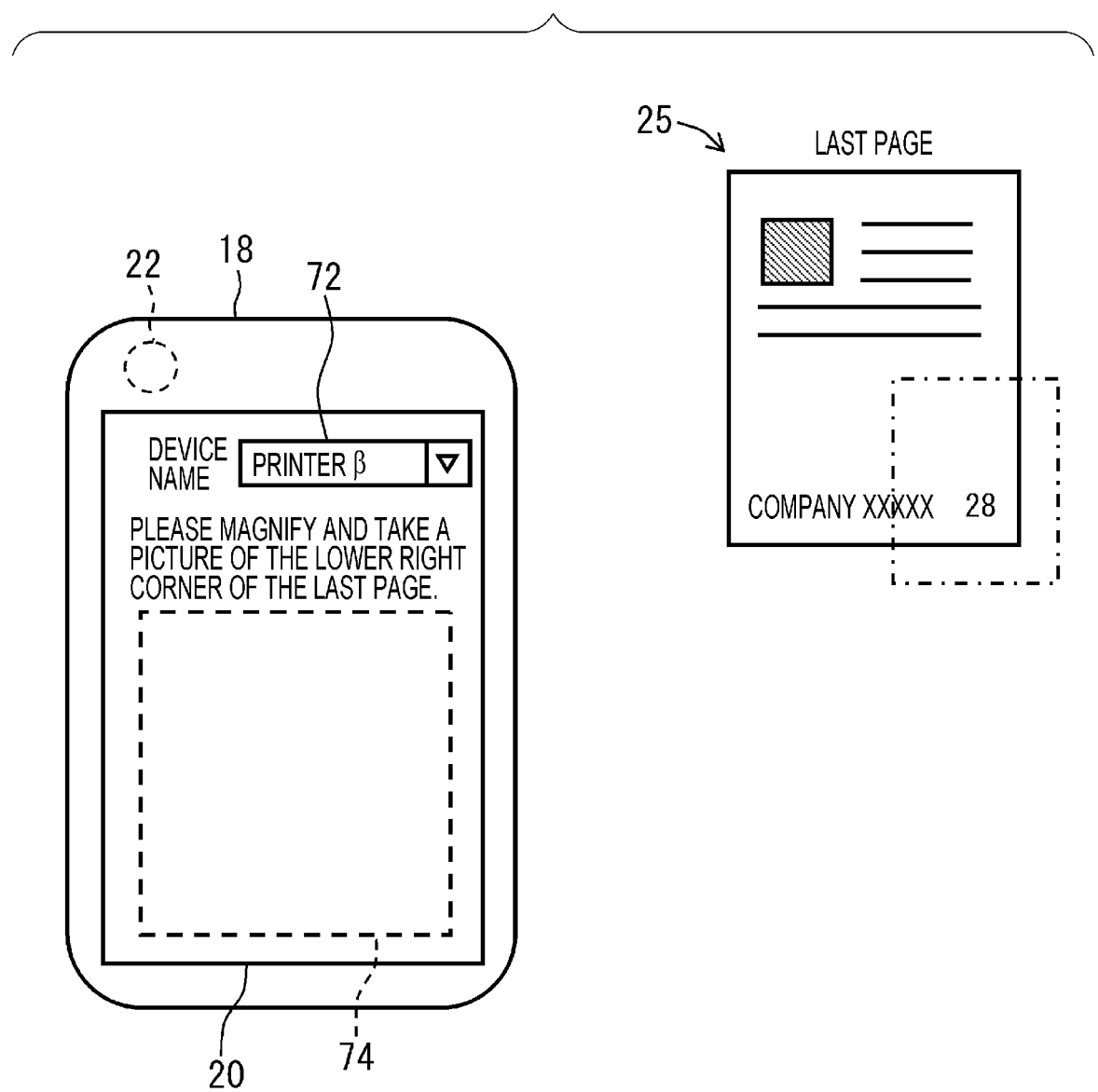
FIG. 8 is a diagram for describing another verification of the last page of a print job.

In the above-described exemplary embodiment, an image of the entire first page or last page of the actual result is taken with the camera, and image data of the entire page serves as the actual result data 62 to be verified by being compared with the expected result data 42. However, as illustrated in FIG. 8, an image of part of the first page or the last page of the actual result may be taken, and partial image data of the page may serve as the actual result data 62 to be verified by being compared with the expected result data 42. In this case, the expected result data 42 is partial image data of the first page or the last page of the expected result. In the example illustrated in FIG. 8, an image of the lower right portion of the last page of the actual result 25 (a portion surrounded by a dot-dash line) is taken with the camera 22 of the terminal apparatus 18, image data of that portion serves as the actual result data 62, and the expected result data 42 corresponding thereto is prepared in advance. In other words, the actual result data 62 is image data of a portion of the actual result corresponding to a predetermined portion of the expected result, which is obtained by the operator by taking an image of the actual result with the camera 22. In the case of performing verification using part of the page, it is desirable to verify a portion where features are likely to be found in contrast to other print jobs or other pages of the same print job.

Figure 9:
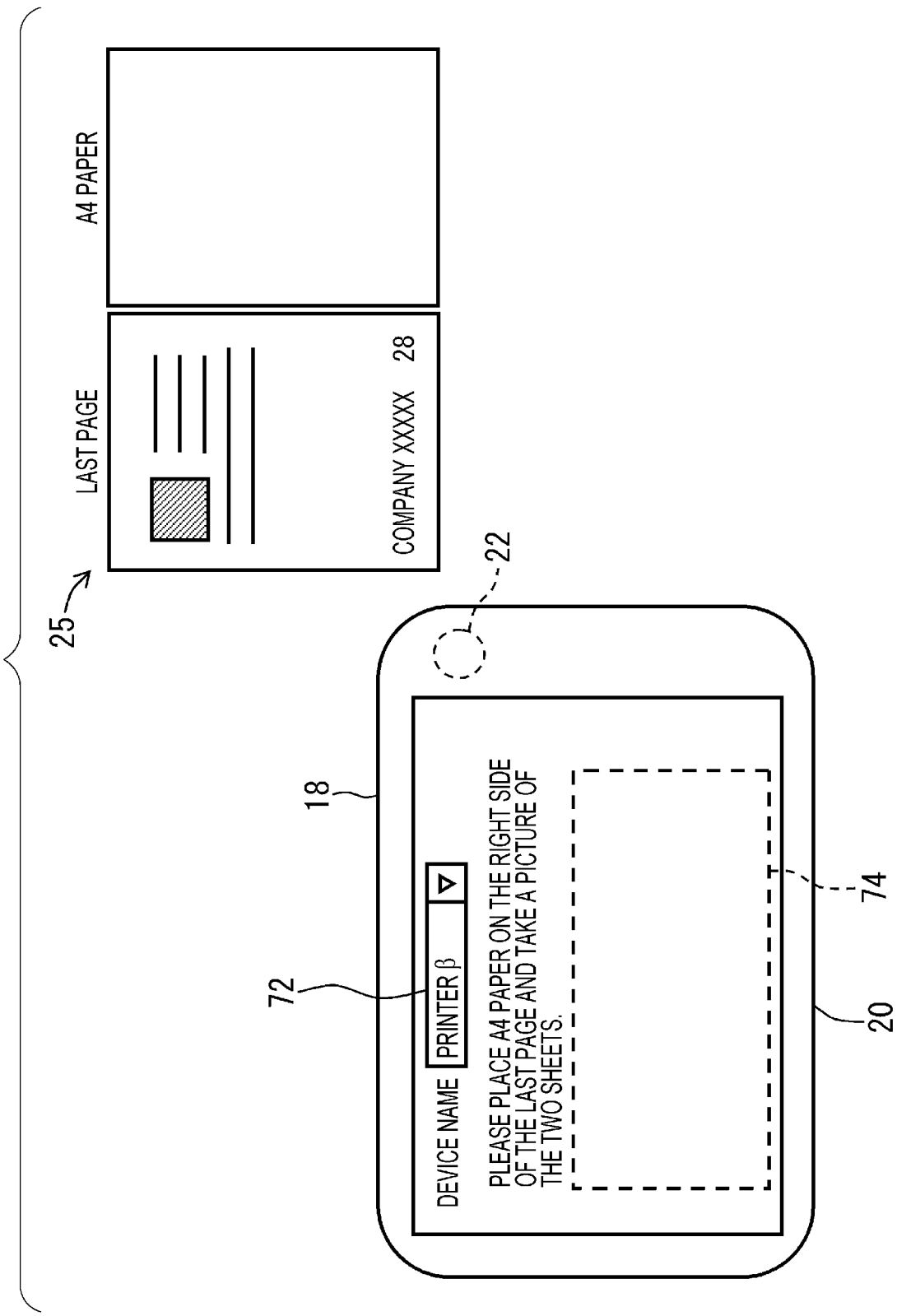
FIG. 9 is a diagram for describing yet another verification of the last page of a print job.

As illustrated in FIG. 9, verification may be performed as follows: a sheet of paper of a specific size (a paper size commonly used, such as A4, A3, or the like) is arranged next to the first page or the last page of the actual result 25, an image of the two sheets arranged next to each other is taken with the camera 22, and image data of the entirety of the two sheets serves as the actual result data 62 to be compared with the expected result data 42. In this case, the expected result data 42 is image data in which a sheet of paper of a specific size and the first page or the last page of the expected result are arranged next to each other. In doing so, whether there is no problem with the paper size of the first page or the last page of the actual result 25 is also verified at the same time.

Figure 10:
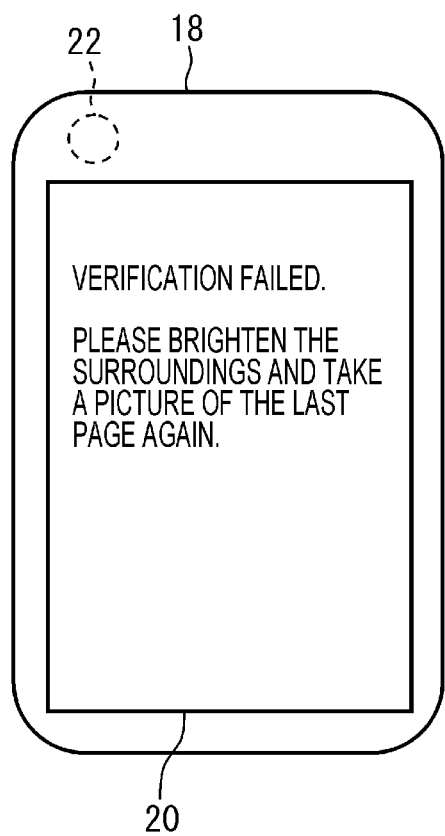
FIG. 10 is a diagram illustrating an example of an error screen.

In addition, in the case where there is an explicit problem with the image quality or the like of the actual result data 62 received from the terminal apparatus 18, the management apparatus 12 may display an error message or an advice as illustrated in FIG. 10 on the display 20 of the terminal apparatus 18.

Figure 11:
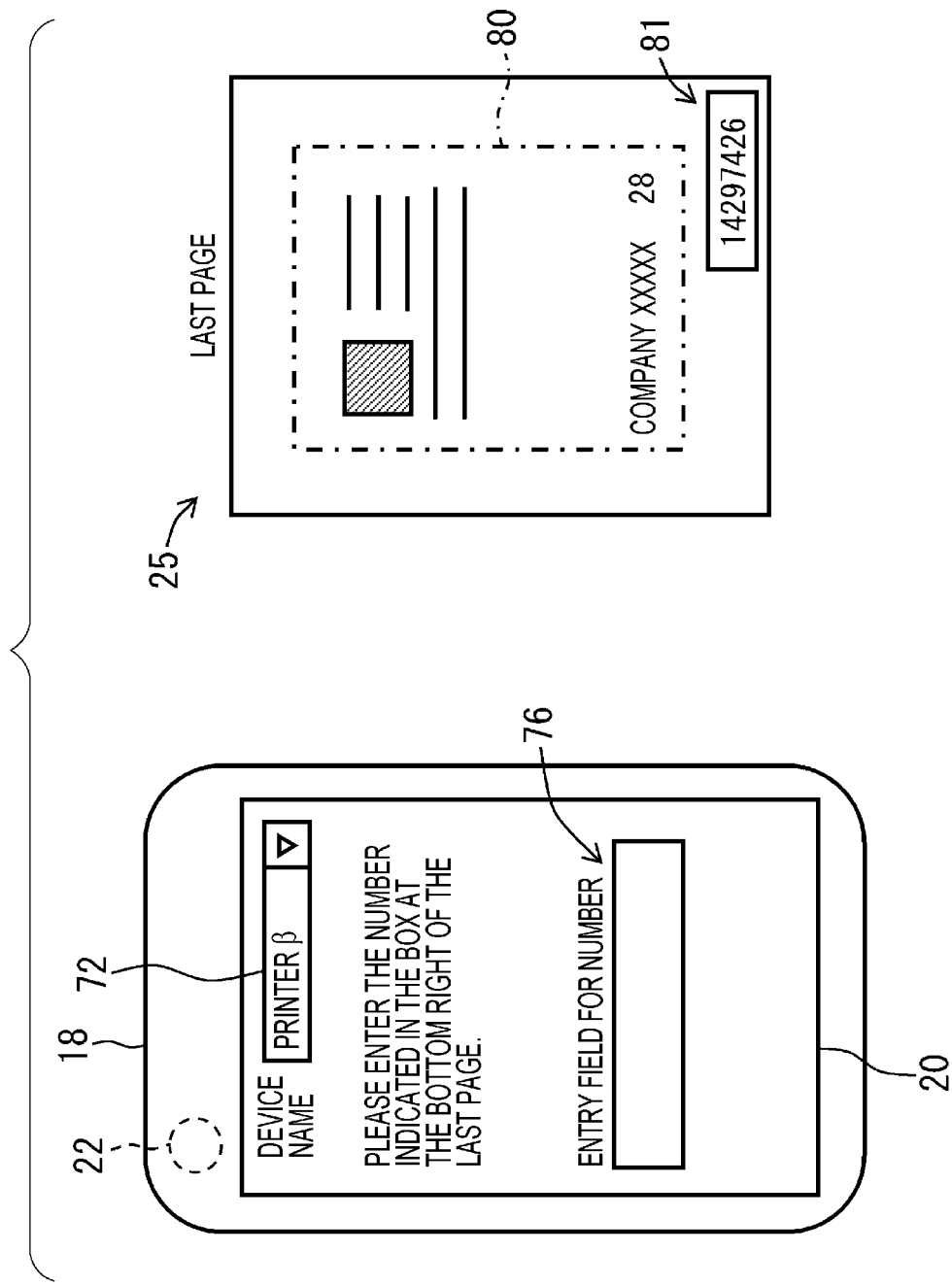
FIG. 11 is a diagram for describing verification based on character information.

In addition, although the expected result data 42 and the actual result data 62 are image data in the above-described exemplary embodiment, they may be other than image data. FIG. 11 is a diagram for describing an exemplary embodiment in the case where the expected result data 42 and the actual result data 62 are character information. As illustrated in FIG. 11, the last page of the actual result 25 includes a cutting position 80 (dash-dot enclosure), and an area outside the cutting position 80 is an area to be cut off in post-processing. Although not illustrated in FIG. 11, pages other than the last page of the actual result 25 also include similar to-be-cut-off areas.

Character information 81 is printed in an area outside the cutting position 80 of each page of the actual result (and the expected result). The character information 81 is information including numbers, symbols, various characters, etc. In the exemplary embodiment, the character information 81 with such randomness that it does not overlap the character information 81 printed in other print jobs or on other pages of the same print job is printed in an area outside the cutting position 80 of each page. That is, the expected result of the print job includes the character information 81 including random numbers, etc. in an area outside the cutting position 80 of each page.

In the exemplary embodiment, verification of the last page (or the first page) of the print job is performed as follows: character information added to the last page (or the first page) of the print job serves as the expected result data 42; character information of the actual result that is obtained by the operator by reading it from the last page (or the first page) of the actual result and inputting it to the terminal apparatus 18 serves as the actual result data 62; and the expected result data 42 and the actual result data 62 are compared with each other. Specifically, the management apparatus 12 compares character information of the expected result data 42 and character information of the actual result data 62, and, when they are identical, determines that there is no problem with the last page (or the first page) of the actual result; and, when they are not identical, determines that there is a problem with the last page (or the first page) of the actual result.

FIG. 11 illustrates the terminal apparatus 18 when verifying the last page in the exemplary embodiment. The operator operates the terminal apparatus 18 to activate a program (application) for verification, thereby displaying a verification screen as indicated in the terminal apparatus 18 illustrated in FIG. 11. The verification screen includes instructions such as "Please enter the number indicated in the box at the bottom right of the last page". Such instructions are stored in advance as the instruction information 38 in the management apparatus 12, and are sent to the terminal apparatus 18 to be displayed. In the case where the printer (such as the printer β) specified in the device specifying section 72 of the verification screen is in the status "processing first page" of the print job, the management apparatus 12 sends instructions regarding the first page; and, in the case where the printer is in the status "continuously processing" of the print job, the management apparatus 12 sends instructions regarding the last page.

The verification screen additionally includes an entry field 76 for character information. By touching the entry field 76 with a finger, the operator displays a keyboard (not illustrated) on the screen, and uses the keyboard to enter the character information 81 printed on the last page of the actual result 25 (the number in the lower right box on the last page illustrated in FIG. 11) in the entry field 76. When the operator presses a send button (not illustrated), the character information entered in the entry field 76 is sent as the actual result data 62 to the management apparatus 12. The management apparatus 12 compares the character information (actual result data 62) received from the terminal apparatus 18 and the expected result data 42 (character information) to perform verification.

In this manner, the actual result data is character information in a portion of the actual result corresponding to a predetermined portion of the expected result, which is obtained by the operator by reading it from the actual result and inputting it to the terminal apparatus 18 (computer). According to the exemplary embodiment, the processing status of a print job may be obtained by computer processing that is simpler than that in the case of comparing image data.

Next, a yet another exemplary embodiment will be described. Although the print jobs in the exemplary embodiments described above are for generating only one copy of a printed matter, print jobs may be for generating two or more copies of an identical printed matter. Hereinafter, the term "identical result" will be used. Identical results are, when plural copies of an identical printed result including one or more pages are ejected from the printer 14 by the operation of the printer 14 in accordance with a print job, printed results including some of the plural copies.

Figure 12:
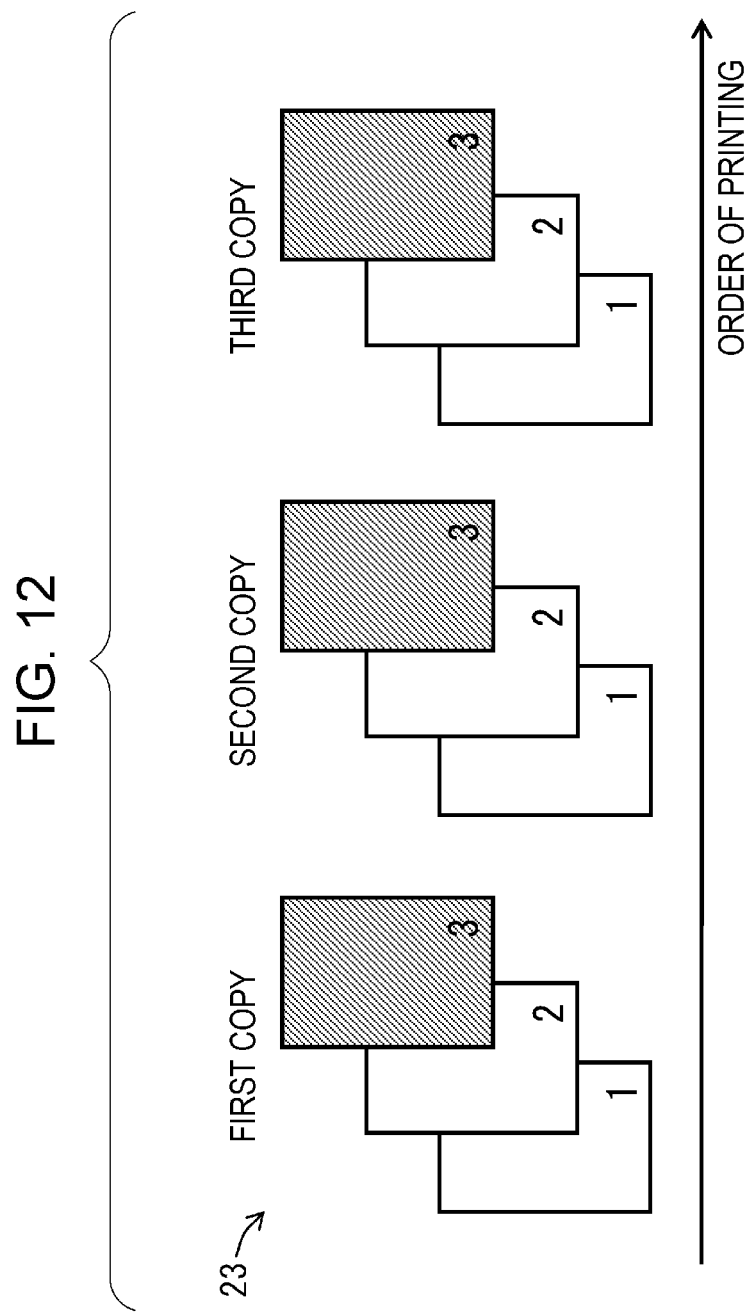
FIG. 12 is a diagram for describing a print job for outputting a plurality of identical results.

In a print job with which a plurality of identical results are obtained, as illustrated in FIG. 12, a plurality of last pages (the third page in FIG. 12) are ejected from the printer 14. Therefore, the operator may happen to verify the last page by taking an image of, instead of the last page of the final identical result (the third copy in FIG. 12), the last page of a previous identical result (the first or second copy illustrated in FIG. 12) with the camera of the terminal apparatus 18. For example, such a case may occur when the printer 14 stops operating due to a paper jam or the like, and, although the processing of the print job is uncompleted, it seems to the operator that the processing is completed. In this case, even though the processing of the print job is not completed, it is determined in the flow illustrated in FIG. 4 that there is no problem with the last page of the print job (S132: YES), and the status of the print job is updated from "continuously processing" to "completed" (S140).

Figure 13:
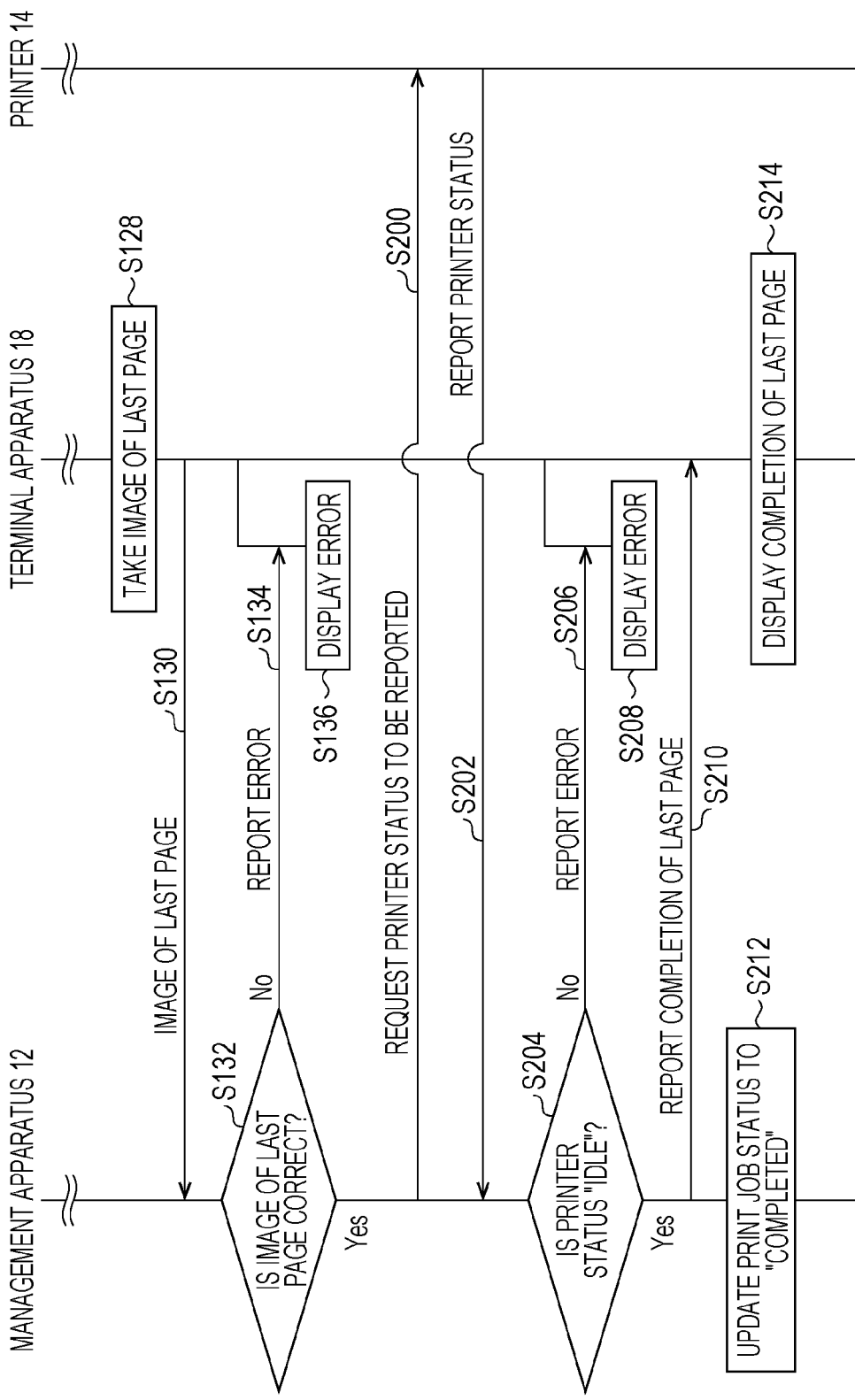
FIG. 13 is a flowchart illustrating an example of the flow of processing of a print job for outputting a plurality of identical results.

To this end, as illustrated in FIG. 13, the status of the print job may be updated by further taking into consideration the status of the printer 14. FIG. 13 is a flowchart of another exemplary embodiment with changes added to the processing after S132 of the flowchart illustrated in FIG. 4. In S132 in FIG. 13, after the management apparatus 12 determines that there is no problem with an image of the last page taken by the operator (S132: YES), in S200, the management apparatus 12 requests a printer 14 that has output the actual result (a printer specified by the operator on the image taking screen or the verification screen described above) to report the printer status. The printer status indicates whether the printer is processing a print job, such as the status of being idle, processing, or error stop (regarded as the status where the processing of the print job is in progress). In response to the request, the printer 14 sends the printer status to the management apparatus 12 (S202).

In S204, in the case where the printer status is idle (the printer is not processing a print job) (S204: YES), the management apparatus 12 determines that the operator has taken an image of the last page of the final identical result, and updates the status of the print job from "continuously processing" to "completed" (S212). In addition, the management apparatus 12 reports completion of the last page of the print job to the terminal apparatus 18 (S210), and, on receipt thereof, the terminal apparatus 18 displays a completion screen of the last page of the print job on the display 20 thereof (S214).

In contrast, in the case where the printer status is a status other than being idle (such as processing or error stop) (S204: NO), the management apparatus 12 determines that the operator has not taken an image of the last page of the final identical result (for example, the operator has taken an image of the last page of the first or second copy in FIG. 12). The management apparatus 12 reports an error of the print job to the terminal apparatus 18 (S206), and, on receipt thereof, the terminal apparatus 18 displays an error screen of the print job on the display 20 thereof (S208).

By adopting the above-described flow illustrated in FIG. 13, even the status of a print job for generating two or more copies of an identical printed matter may be accurately updated.

Next, modifications will be further described. In the above-described exemplary embodiments, the operator enters the identification information of a printer on the image taking screen or the verification screen, the management apparatus 12 receives the entered identification information, and, as a result, the management apparatus 12 identifies a print job corresponding to the actual result data 62. However, the operator's entry of the identification information of a printer may be omitted, and as illustrated in FIG. 14, candidates for a print job corresponding to the actual result data 62 may be displayed on the terminal apparatus 18, and the operator may select a print job from the candidates. In this case, when only one of the print jobs is in the status "processing first page" or "continuously processing", the management apparatus 12 may identify that print job as a print job corresponding to the actual result data 62 without displaying a selection screen as illustrated in FIG. 14. In contrast, when plural print jobs are in the status "processing first page" or "continuously processing", the management apparatus 12 displays a selection screen as illustrated in FIG. 14 with those print jobs in that status as candidates, and prompts the operator to select a print job corresponding to the actual result data 62. In the example illustrated in FIG. 14, selection buttons 84-1 and 84-2 of two print jobs A and B are displayed, and the operator touches either one of the selection buttons 84-1 and 84-2 with a finger to select a print job. In doing so, the management apparatus 12 may identify a print job corresponding to the actual result data 62.

In the above-described exemplary embodiments, at a time point at which printing of the first page or the last page is completed, each printer 14 may send, directly to the terminal apparatus 18 or to the terminal apparatus 18 via the management apparatus 12, a message prompting the operator to take an image with the camera or to enter character information for verification. The terminal apparatus 18 receives the message and displays the message on its display 20, thereby prompting the operator to perform verification.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A print job management apparatus comprising:
   a processor; and
   memory configured to store data of an expected result of a print job,
   wherein the processor is configured to:
      read the data of the expected result from the memory, wherein the data of the expected result includes image data of a predetermined portion of the expected result;
      obtain data of an actual result printed and output in accordance with the print job, wherein the data of the actual result includes image data of a portion of the actual result corresponding to the predetermined portion of the expected result, which is obtained by an operator by taking an image of the actual result with a camera; and
      based on a result of comparison between the data of the expected result and the data of the actual result, obtain a processing status of the print job.

2. The print job management apparatus according to claim 1, wherein:
   the expected result includes a plurality of pages, and
   the processor is configured to:
      obtain a processing status of the print job, based on a result of comparison between partial or entire image data of a predetermined page of the expected result and image data of a portion of the actual result corresponding thereto.

3. The print job management apparatus according to claim 2, wherein:
   the processor is configured to:
      estimate whether entire printing of the print job is completed, based on a result of comparison between partial or entire image data of a last page of the expected result and image data of a portion of the actual result corresponding thereto.

4. The print job management apparatus according to claim 2, wherein:
   the processor is configured to:
      obtain whether printing of a first page of the print job is completed, based on a result of comparison between partial or entire image data of a first page of the expected result and image data of a portion of the actual result corresponding thereto.

5. The print job management apparatus according to claim 2, wherein:
   the expected result includes a plurality of identical results, and
   the processor is configured to:
      obtain, from a printer that performs printing and outputting in accordance with the print job, a status of the printer; and
      estimate whether entire printing of the print job is completed, based on the status of the printer, and a result of comparison between partial or entire image data of a last page of the identical result of the expected result and image data of a portion of the actual result corresponding thereto.

6. The print job management apparatus according to claim 1, wherein:
   the processor is configured to:
      report a method of taking an image of the actual result with the camera to a terminal apparatus possessed by the operator.

7. The print job management apparatus according to claim 2, wherein:
   the processor is configured to:
      report a method of taking an image of the actual result with the camera to a terminal apparatus possessed by the operator.

8. The print job management apparatus according to claim 3, wherein:
   the processor is configured to:
      report a method of taking an image of the actual result with the camera to a terminal apparatus possessed by the operator.

9. The print job management apparatus according to claim 4, wherein:
   the processor is configured to:
      report a method of taking an image of the actual result with the camera to a terminal apparatus possessed by the operator.

10. The print job management apparatus according to claim 5, wherein:
    the processor is configured to:
       report a method of taking an image of the actual result with the camera to a terminal apparatus possessed by the operator.

11. The print job management apparatus according to claim 1, wherein:
    the data of the expected result includes character information in the predetermined portion of the expected result, and
    the data of the actual result includes character information in a portion of the actual result corresponding to the predetermined portion of the expected result, which is obtained by an operator by reading the character information from the actual result and inputting the character information to a computer.

12. The print job management apparatus according to claim 11, wherein:
    the expected result includes a plurality of pages, and
    the processor is configured to:
       obtain a processing status of the print job, based on a result of comparison between character information in a predetermined portion of a predetermined page of the expected result and character information of a portion of the actual result corresponding thereto.

13. The print job management apparatus according to claim 11, wherein:
the processor is configured to:
report a position of the character information in a to-be-read target of the actual result to a terminal apparatus possessed by the operator.

14. The print job management apparatus according to claim 12, wherein:
the processor is configured to:
report a position of character information in a to-be-read target of the actual result to a terminal apparatus possessed by the operator.

15. A print job management method comprising:
reading data of an expected result of a print job from a memory, wherein the data of the expected result includes image data of a predetermined portion of the expected result;
obtaining data of an actual result printed and output in accordance with the print job, wherein the data of the actual result includes image data of a portion of the actual result corresponding to the predetermined portion of the expected result, which is obtained by an operator by taking an image of the actual result with a camera; and
based on a result of comparison between the data of the expected result and the data of the actual result, obtaining a processing status of the print job.

16. A non-transitory computer readable medium storing a program causing a computer to execute a process, the process comprising:
reading data of an expected result of a print job from a memory, wherein the data of the expected result includes image data of a predetermined portion of the expected result;
obtaining data of an actual result printed and output in accordance with the print job, wherein the data of the actual result includes image data of a portion of the actual result corresponding to the predetermined portion of the expected result, which is obtained by an operator by taking an image of the actual result with a camera; and
based on a result of comparison between the data of the expected result and the data of the actual result, obtaining a processing status of the print job.

* * * * *